C. E. BOWEN.
WINDOW SCREEN FLY TRAP.
APPLICATION FILED FEB. 18, 1908.
910,492.
Patented Jan. 26, 1909.
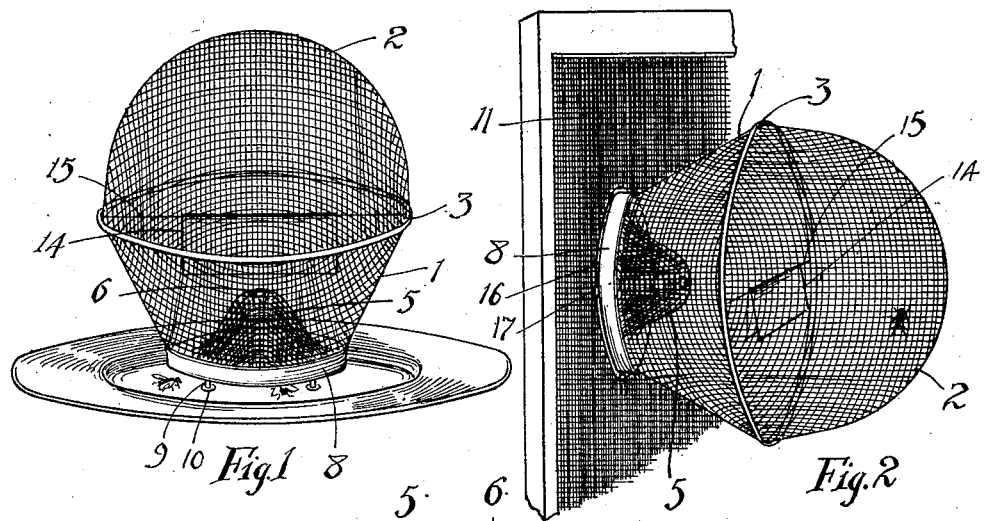
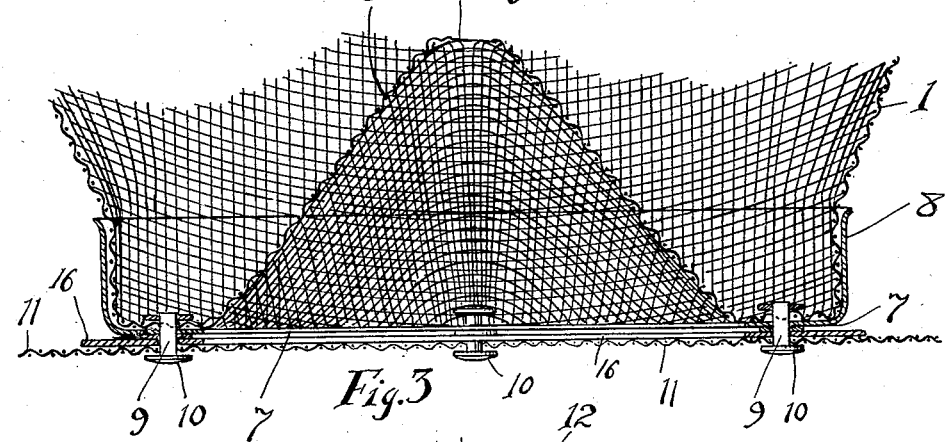
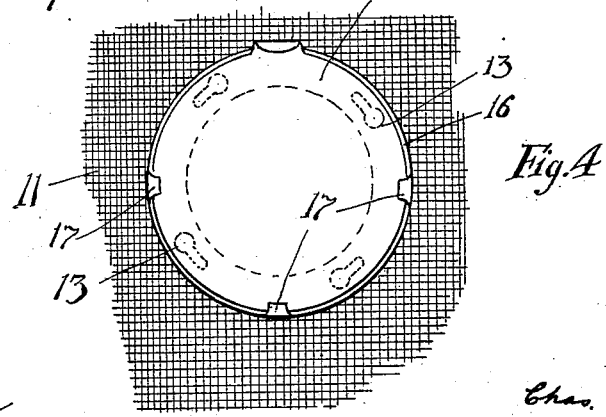
WITNESSES:
INVENTOR,
Chas. E. Bowen,
BY
F. M. Wright,
ATTORNEY.

UNITED STATES PATENT OFFICE.

CHARLES E. BOWEN, OF ALAMEDA, CALIFORNIA.

WINDOW-SCREEN FLY-TRAP.

No. 910,492.

Specification of Letters Patent.

Patented Jan. 26, 1909.

Application filed February 18, 1908. Serial No. 416,557.

*To all whom it may concern:*

Be it known that I, CHARLES E. BOWEN, a citizen of the United States, residing at Alameda, in the county of Alameda and State of California, have invented new and useful Improvements in Window-Screen Fly-Traps, of which the following is a specification.

The object of the present invention is to provide a fly trap which may be used either in the ordinary manner of using such traps, namely, by placing the same upon a table within the room, or which may be used as a window screen fly trap, by attaching the same to a window screen, and excluding from the room all light except that coming through the screen.

A further object of the invention is to provide one which shall be more convenient in use as window screen fly trap than prior devices of this character.

In the accompanying drawing, Figure 1 is a perspective view of my improved fly trap, showing the same in use within a room; Fig. 2 is a similar view showing the same when used as a window screen trap; Fig. 3 is an enlarged sectional view of the lower portion of the trap; Fig. 4 is a broken front view of a portion of a screen and of the closure for closing the opening therein when not using the trap over said opening.

Referring to the drawing, 1 indicates the body portion or wall of the fly trap, formed of woven wire in the usual manner, and 2 indicates a semi-globular top or cover for the same also formed of woven wire, and attached, in the usual manner, as shown at 3, to the body portion of the trap. Formed integral with the body, 1 is the reëntrant conical guideway 5 terminating in a central aperture 6 leading to the interior of the trap. All of the above construction is old in the art.

To the bottom of the wall 1 is secured an annular base 7 having an outwardly flaring ring extending around the bottom of the wall 1. To said base are secured a suitable number, as four, of pins 9 having heads 10. These are of a sufficient height that, when the trap is placed upon a level surface, the bottom of the wall will be high enough above said surface to allow flies to pass thereunder, when attracted by a bait in the trap. Thus the device can be used in a room in the same way as an ordinary fly trap.

11 indicates a window screen, in which is formed a circular aperture, around which is secured on the outside of said screen a sheet metal band 16. In said band are formed buttonhole slots 13 corresponding in number and position with the pins 9, the wide parts of the slots being adapted to receive the heads 10 of the pins, so that by turning the trap through a slight angle, the shanks of the pins are received with the narrow parts of the slots, and the trap is thereby secured in position on the screen. When the trap is not used on the screen, the opening therein may be closed by a disk-shaped closure 12 which is retained in place by ears 17 formed on the band 16. In either position, whether in a room or on the outside upon a screen, the flies may be attracted to the interior of the trap by means of paper or cloth 14, moistened with some attractive substance, such as vinegar and molasses, and conveniently supported within the trap by being hung on a wire 15 extending across the middle portion of the trap and secured at its ends to one of the bands 3.

An important feature of the invention consists in the provision of means, such as the pins 9, whereby the fly trap may be used either in the ordinary manner or in conjunction with a window screen. This capability results from the fact that said pins are sufficiently long to support the body of the trap above the level surface high enough to allow flies to pass thereunder, while at the same time the shanks of the pins are not so long between their heads 10 and the base 7 that, when they are used in combination with the slotted band 12 on a window screen, flies can pass between the band 12 and the base 7 and thus escape.

I claim:—

1. A fly trap of the character described comprising an outer wall and an inner conical guide, both of woven wire, a wire extending across the interior of said trap adapted to support paper thereon, and means whereby the same may be secured to a screen around an opening therein, said means extending from the bottom of said trap to space said bottom from a level surface, when the trap is placed thereon, sufficiently to allow a fly to pass thereunder, substantially as described.

2. In combination with a band around an opening in a screen and having buttonhole slots, a fly trap comprising an outer wall and an inner conical guide, both of woven wire, and a base secured to the bottom of said wall, said base having headed pins of a height greater than the height of a fly, and adapted to be connected with said buttonhole slots, and the shanks of said pins being sufficiently short, that when so connected, a fly cannot pass between the band and base, substantially as described.

In testimony whereof I have hereunto set my hand in the presence of two subscribing witnesses.

CHARLES E. BOWEN.

Witnesses:
FRANCIS M. WRIGHT,
D. B. RICHARDS.